(12) United States Patent
Remer et al.

(10) Patent No.: US 9,341,117 B2
(45) Date of Patent: May 17, 2016

(54) COMBINED SUMP SERVICE

(71) Applicant: General Electric Company, Schenectady, NY (US)

(72) Inventors: Jonathan Remer, Saugus, MA (US); Jacob Seal, Pittsburgh, PA (US); Krzysztof Chelstowski, Warsaw (PL)

(73) Assignee: General Electric Company, Schenectady, NY (US)

( * ) Notice: Subject to any disclaimer, the term of this patent is extended or adjusted under 35 U.S.C. 154(b) by 277 days.

(21) Appl. No.: 14/107,021

(22) Filed: Dec. 16, 2013

(65) Prior Publication Data
US 2014/0174858 A1 Jun. 26, 2014

(30) Foreign Application Priority Data
Dec. 21, 2012 (PL) ............................... 402185

(51) Int. Cl.
*F02C 7/06* (2006.01)
*F01D 25/18* (2006.01)
*F01D 25/32* (2006.01)
*F01M 1/12* (2006.01)

(52) U.S. Cl.
CPC . *F02C 7/06* (2013.01); *F01D 25/18* (2013.01); *F01D 25/32* (2013.01); *F01M 2001/126* (2013.01); *F05D 2220/31* (2013.01); *Y02T 50/671* (2013.01)

(58) Field of Classification Search
CPC ..... F01D 25/18; F01D 25/32; F01D 2220/31; F01M 2001/126; F02C 7/06
USPC ................................. 184/6.11, 106
See application file for complete search history.

(56) References Cited

U.S. PATENT DOCUMENTS

| | | | |
|---|---|---|---|
| 2,617,495 A | 11/1952 | Johnson | |
| 6,893,208 B2 * | 5/2005 | Frosini | F01D 25/16 184/6 |
| 8,210,316 B2 * | 7/2012 | DiBenedetto | F01D 9/064 184/6.11 |
| 8,672,095 B2 * | 3/2014 | Charier | F01D 25/125 184/6.23 |
| 2008/0134657 A1 | 6/2008 | DiBenedetto et al. | |
| 2010/0058729 A1 * | 3/2010 | Fomison | F01D 25/18 60/39.08 |
| 2011/0198155 A1 | 8/2011 | Charier et al. | |
| 2012/0324899 A1 * | 12/2012 | DiBenedetto | F01D 25/18 60/772 |
| 2014/0064930 A1 * | 3/2014 | NguyenLoc | F01D 15/12 415/122.1 |
| 2014/0182972 A1 * | 7/2014 | Hetherington | F02C 7/06 184/6.11 |
| 2015/0315933 A1 * | 11/2015 | Do | F01D 25/18 415/112 |

FOREIGN PATENT DOCUMENTS

| | | |
|---|---|---|
| EP | 1130221 A1 | 9/2001 |
| EP | 2163733 | 3/2010 |
| GB | 529500 A | 11/1940 |

OTHER PUBLICATIONS

Polish Search Report from corresponding Polish Application No. P402185, Dated Apr. 10, 2013.
EP Search Report issued in connection with corresponding EP Application No. 13198025.2 on Sep. 10, 2014.

* cited by examiner

*Primary Examiner* — William E Dondero
*Assistant Examiner* — Robert T Reese
(74) *Attorney, Agent, or Firm* — General Electric Company; William Scott Andes

(57) ABSTRACT

A combined sump structure in an engine, the combined sump structure comprises a sump area comprising one or more sumps, a single oil supply provided for all sumps, and a combined sump drain.

20 Claims, 10 Drawing Sheets

'B' SUMP FRAME

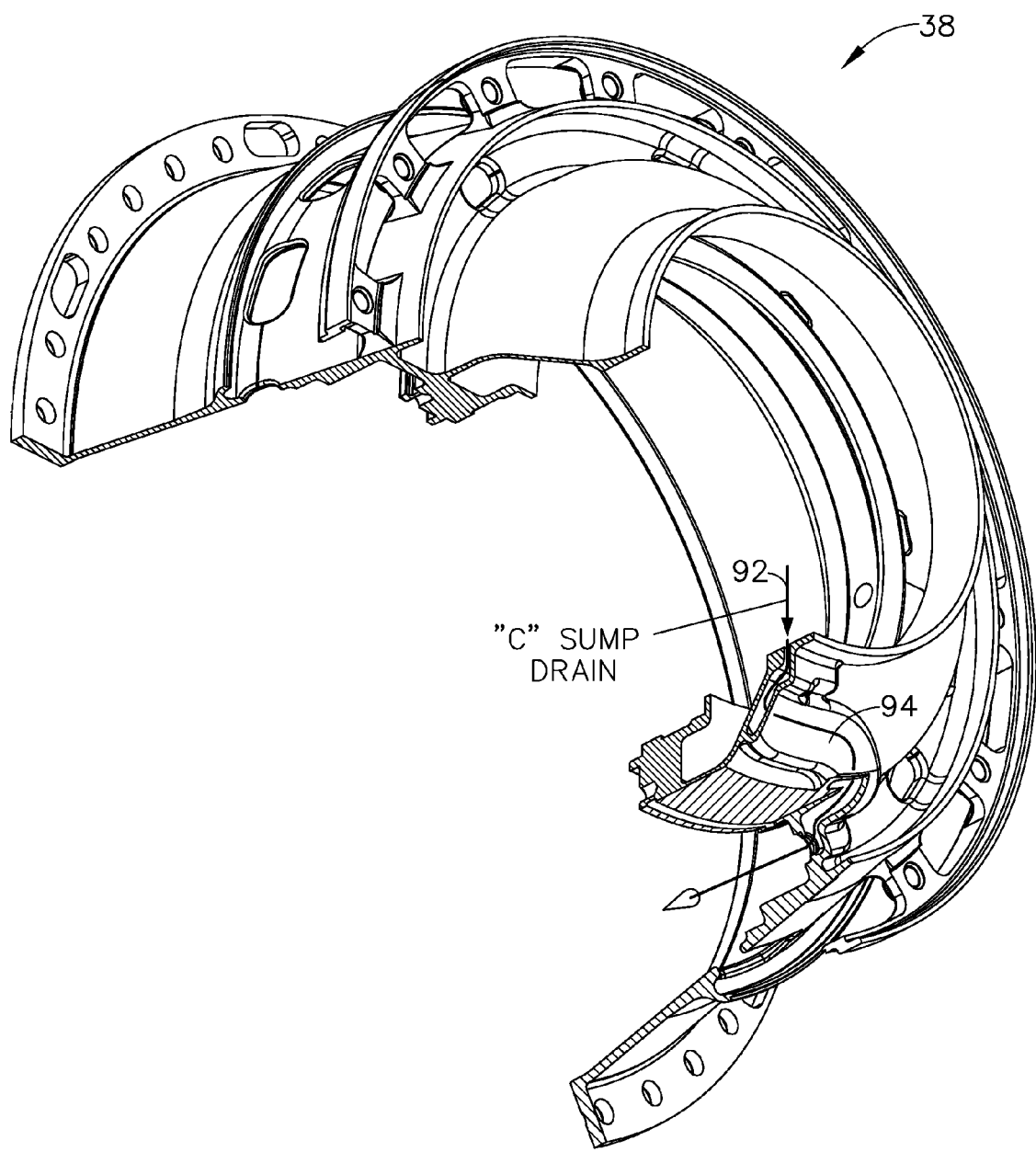
FIG. 10   "C" SUMP AFT FRAME

COMBINED SUMP SERVICE

BACKGROUND OF THE INVENTION

The present invention relates generally to apparatuses and methods for combining two separate sumps into a single area in effort to save space and weight in a turbine engine. More specifically, but not by way of limitation, the present invention relates to apparatuses and methods for mounting two sumps to a single frame and sharing common oil supply and drain lines.

In the turbine engine, air is pressurized in a compressor and mixed with fuel in a combustor for generating hot combustion gases which flow downstream through turbine stages. These turbine stages extract energy from the combustion gases. A high pressure turbine includes a first stage nozzle and a rotor assembly including a disk and a plurality of turbine blades. The high pressure turbine first receives the hot combustion gases from the combustor and includes a first stage stator nozzle that directs the combustion gases downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles turn the hot combustion gas in a manner to maximize extraction at the adjacent downstream turbine blades.

The first and second rotor disks are joined to the compressor by a corresponding rotor shaft for powering the compressor during operation. The turbine engine may include a number of stages of static air foils, commonly referred to as vanes, interspaced in the engine axial direction between rotating air foils commonly referred to as blades. A multi-stage low pressure turbine follows the two stage high pressure turbine and is typically joined by a second shaft to a fan disposed upstream from the compressor in a typical turbo fan aircraft engine configuration for powering an aircraft in flight.

As the combustion gasses flow downstream through the turbine stages, energy is extracted therefrom and the pressure of the combustion gas is reduced. The combustion gas is used to power the compressor as well as a turbine output shaft for power and marine use or provide thrust in aviation usage. In this manner, fuel energy is converted to mechanical energy of the rotating shaft to power the compressor and supply compressed air needed to continue the process.

It is always desirable to decrease the weight of a gas turbine engine utilized in the aviation industry. Such weight reduction results in higher efficiency of the engine and improved efficiency save cost for operators.

It is also desirable to decrease the number of parts in a turbine engine which improves manufacturability and also improves the efficiency aspects previously noted.

In known turbine engines, the aft portion of the rotor shaft is typically supported for rotation by utilizing aft bearing assemblies. These bearing assemblies are lubricated and cooled through the use of separate oil sump systems. However, commensurate with the goal of decreasing weight of an engine, decreasing the length of the engine and improving manufacturability of the engine, it would be desirable to provide that the sump be as close together as possible, reduce the weight of the multiple sumps and utilize common lines where possible to decrease the number of parts in the turbine engine.

As may be seen by the foregoing, there is a need for limiting the amount of weight, improving efficiency and manufacturability of a turbine engine.

SUMMARY OF THE INVENTION

Embodiments of the present disclosure involve a combined sump service wherein oil sumps are moved closer together and routing of supply and drain lines are simplified due to commonalities between the two. The structure also will utilize a common pressurization circuit.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE DRAWINGS

The above-mentioned and other features and advantages of this invention, and the manner of attaining them, will become more apparent and the common sump service will be better understood by reference to the following description of embodiments taken in conjunction with the accompanying drawings.

FIG. 10 depicts an isometric section view of the C sump aft frame, according to an embodiment of the invention.

DETAILED DESCRIPTION OF THE INVENTION

Figure 1:
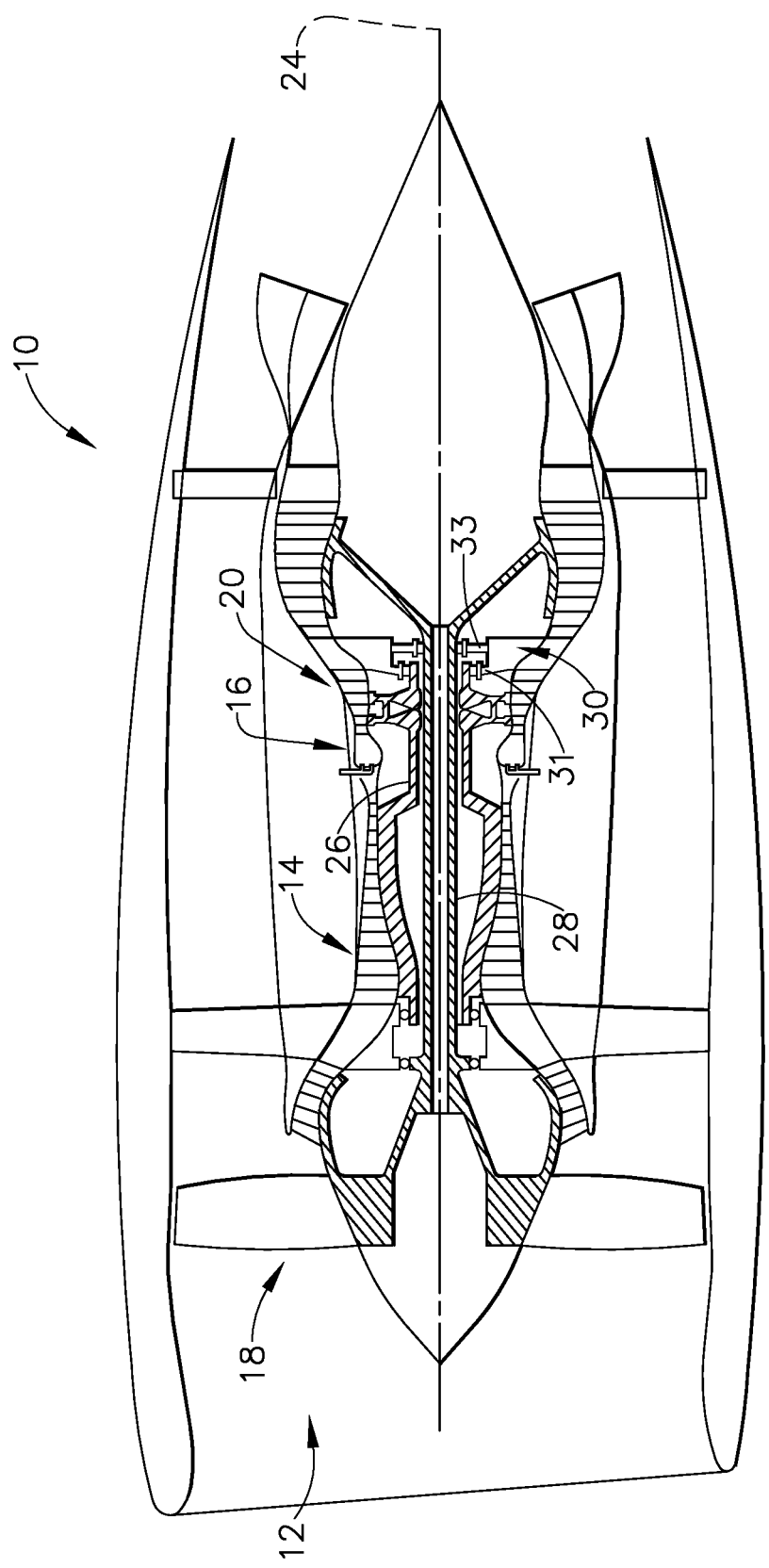
FIG. 1 is a side section view of an exemplary turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

The present embodiments apply to a gas turbine engine, for example and with aviation, power generation, industrial or marine, in which a combustor burns fuel and discharges hot combustion gas into a high pressure turbine. The exemplary structures and methods provide combined sump service at, for example, an aft end of the turbine engine which reduces engine length, saves weight and improve other characteristics of the engine.

The terms fore and aft are used with respect to the engine axis and generally mean toward the front of the turbine engine or the rear of the turbine engine in the direction of the engine axis.

Referring now to FIGS. 1-10, the various embodiments depict apparatuses and methods of combining sump service and supporting from a single engine frame.

Referring initially to FIG. 1, a schematic side section view of a gas turbine engine 10 is shown having an engine inlet end 12, a compressor 14, a combustor 16 and a multi-stage high pressure turbine 20. The gas turbine 10 may be used for aviation, power generation, industrial, marine or the like. The gas turbine 10 is axis-symmetrical about engine shaft 26 or axis 24 so that the components rotate thereabout. Depending on the usage, the engine inlet end 12 may alternatively contain multistage compressors or a fan 18. In operation air enters through the air inlet end 12 of the engine 10 and moves through at least one stage of compression where the air pressure is increased and directed to the combustor 16. The compressed air is mixed with fuel and burned providing the hot combustion gas which exits a combustor nozzle toward the high pressure turbine 20. At the high pressure turbine 20, energy is extracted from the hot combustion gas causing rotation of turbine blades which in turn cause rotation of the shaft 26 which passes toward the front of the engine to continue rotation of the one or more compressors 14, a turbo fan 18 or inlet fan blades, depending on the turbine design.

The axis-symmetrical shaft 26 extends through the turbine engine forward end into an aft end and is supported by bearings along the length of the shaft structure. The shaft rotates about a centerline 24 of the engine 10. During operation, the shaft rotates along with other structures connected to the shaft such as the rotor assemblies of the turbine in order to create power or thrust for various types of turbines used in power and industrial or aviation areas of use. The shaft 26 is supported by these bearings which operate in oil sumps to cool parts during the high speed revolution.

As shown in FIG. 1, combined sump structure 30 is depicted schematically in an engine 10. The example, not meant to be limiting, illustrates the combined sump structure 30 being at an aft end of the engine 10; however, alternatives provide that the combined sump structure is disposed at any position in or on the engine 10 as may be desired. Embodiments for the sump area 30 include one or more sumps. The example illustrates the one or more sumps being a first forward sump 31 and a second aft sump 33, typically referred to as B sump and C sump, are schematically indicated. The combined sump area 30 supports rotation of the high pressure and low pressure shafts 26, 28 at this rear position. As previously described, it is highly desirable to reduce the weight of the turbine engine and one way to do this is to reduce the number of parts as well as shorten the length of the engine to increase fuel efficiency and potentially increase thrust of the engine 10. Accordingly, certain aspects of the present disclosure deal with combining the sumps in the area 30 in order to decrease the number of duplicative components, decrease engine weight and improve manufacturability of the turbine engine.

Figure 2:
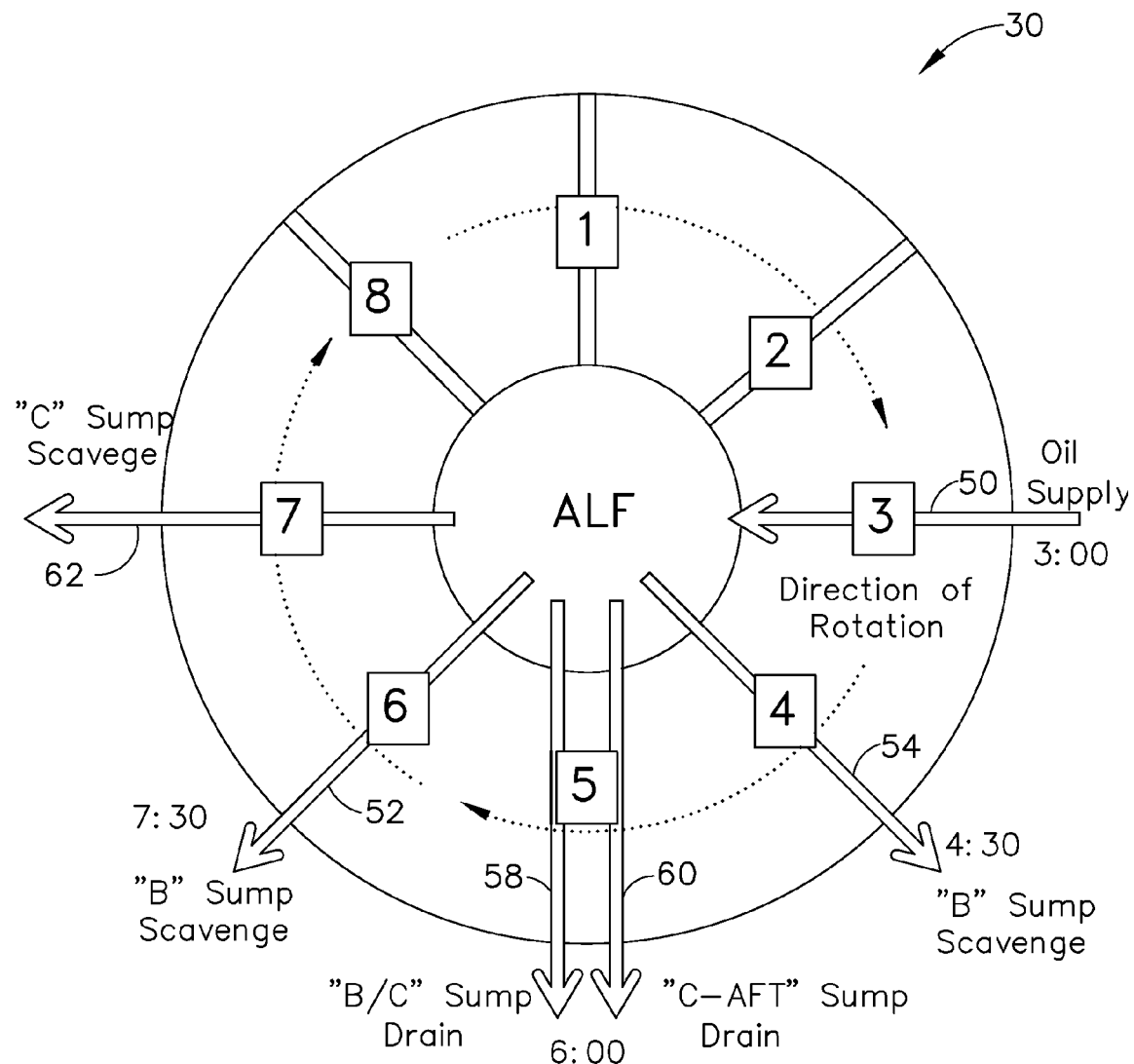
FIG. 2 is an aft looking forward schematic view of the combined sump system with the various oiling circuits shown, according to an embodiment of the invention.

Referring now to FIG. 2, an aft looking forward schematic figure depicts the combined sump service area 30 wherein a single oil supply 50 is provided for both sumps 31, 33. With respect to the example illustrated in FIG. 2, additionally provided are first and second B sump scavenges 52, 54, a single C sump scavenge 62 and a combined B sump/C sump drain 58 and an aft C sump drain 60. In addition to the exemplary embodiment of FIG. 2, other embodiments provide one or more B sump scavenges and one or more C sump scavenges. The figure shows the approximate rotation of the lines 50, 52, 54, 58, 60 and 62 relative to a clock face if the engine 10 is viewed aft looking forward. The lines 50, 52, 54, 58, 60 and 62 are disposed within the structure of the turbine engine 10. For some embodiments, the lines are, as desired, formed integrally within or disposed within one or more fairings (see the isometric views of FIGS. 3 and 4) associated with a turbine center frame.

Additionally, one skilled in the art should understand that the oil supply 50 provides oil to bearings, seal runners and other lubricant dependent components. Although bearings are described throughout, these are exemplary and not limiting as any lubricant dependent parts may be serviced. The B sump scavenges 52, 54 and C sump scavenge 62 collect oil which has been applied to the lubricant dependent components and returns the oil to a reservoir tank for the system. The scavenge paths 52, 54, 62 may operate under slight vacuum pressure from a scavenge pump to take oil from the sump areas after it has been applied to lubricate or cool parts. The sump drains 58, 60 additionally capture oil leaked in the process and allow drainage of such oil to atmosphere.

Figure 3:
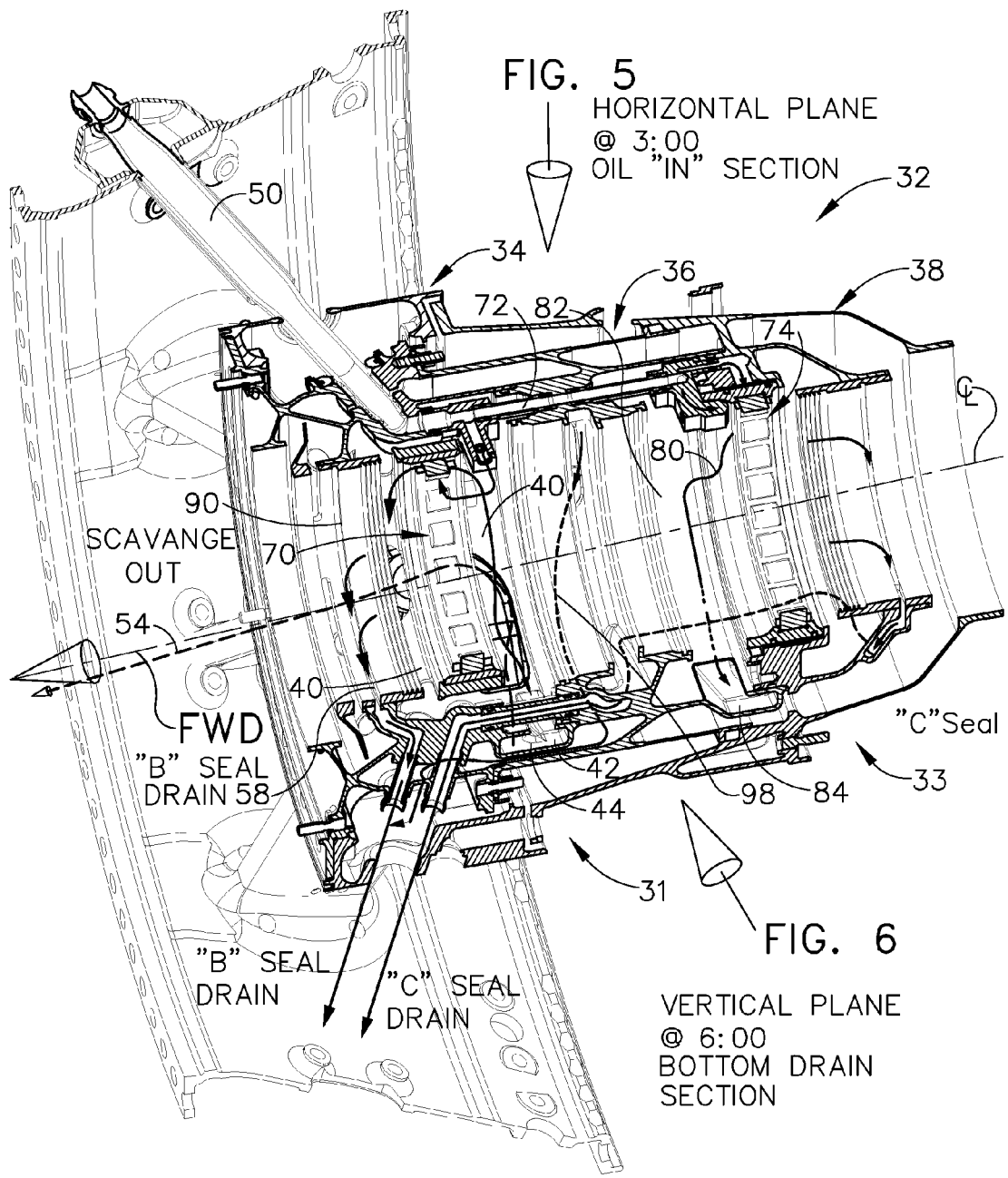
FIG. 3 is a section view of the aft sump frame assembly, according to an embodiment of the invention.

Referring now to FIG. 3, illustrated is an isometric section view of an example of a turbine center frame having fairings within which supply and scavenge lines 50, 52, 54, 58, 60 and 62 are disposed. In this example, the turbine center frame is depicted as a combined sump frame assembly 32. As such, it should be noted that the engine 10 has frame structures from which the combined sump frame assembly 32 is supported. The frame assembly 32 includes a forward member 34 (see also FIG. 8), a middle member 36 (see also FIG. 9) and an aft member 38 (see also FIG. 10). The oil supply 50 is depicted passing into the frame assembly 32 at for example a forward end of the aft frame assembly 32. More specifically, the oil supply 50 receives oil from a source such as a reservoir or tank through the forward frame member 34 to supply oil to the bearing assembly to and other fluid dependent components. The oil supply 50 extends through a single pathway 72 in the aft direction through the mid and aft members 36, 38 in order to lubricate additional bearings 74 as well. Thus, the oil supply 50 extends through a single passageway to service bearing assemblies 70, 74 of the aft frame assembly 32 wherein each assembly 70, 74 has a distinct sump.

Figure 5:
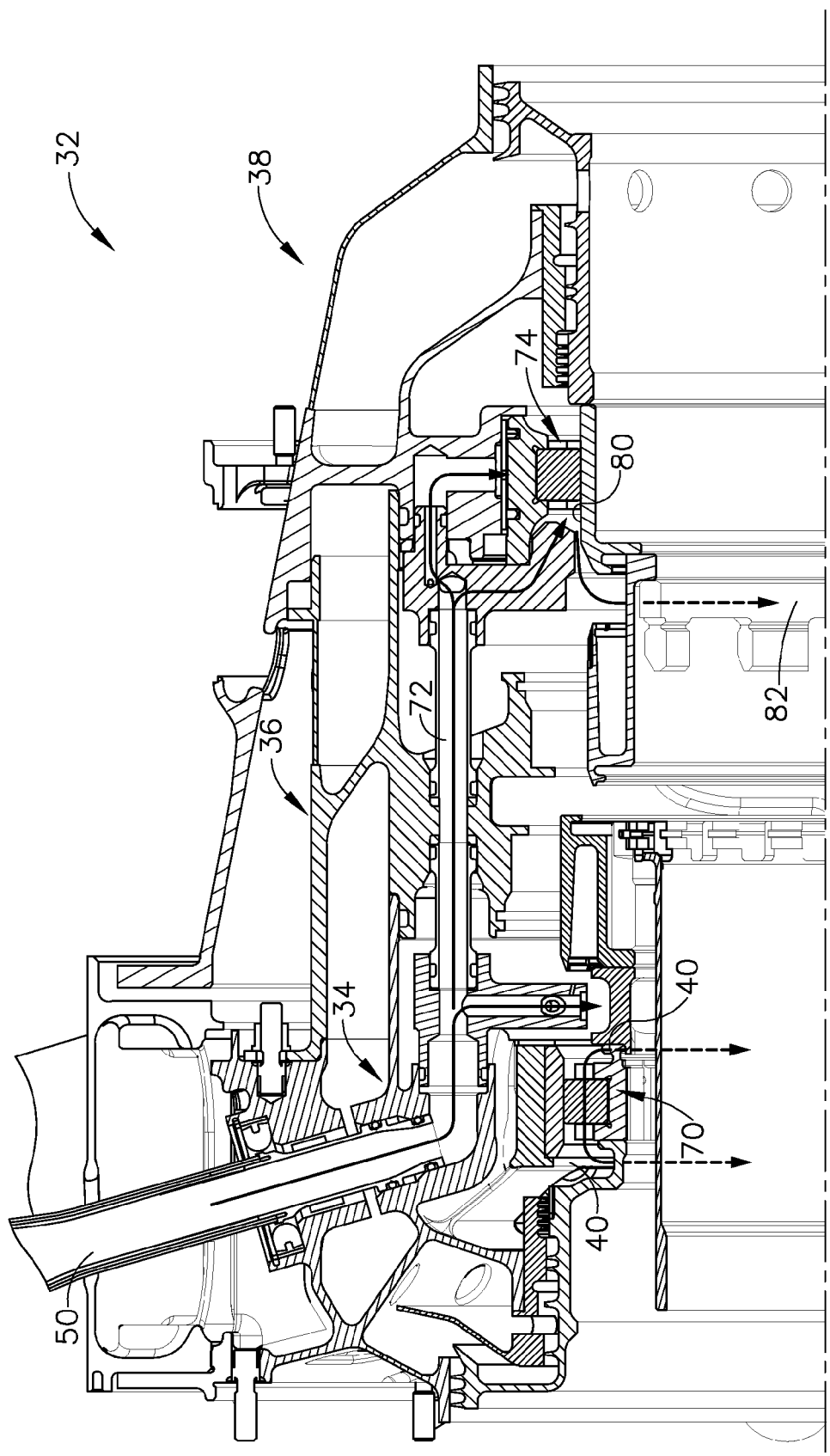
FIG. 5 is a horizontal section view depicting the oil supply line to multiple sump areas, according to an embodiment of the invention.

With reference to FIG. 5, the oil in or oil supply line 50 is depicted at the forward end of the aft frame assembly 32. The supply line 50 enters in the forward frame member 34 and turns aft moving through passage 72 to lubricate bearings 70, 74. According to an embodiment, the oil supply line 50 passes through B-sump 31 to reach C-sump 33.

Figure 8:
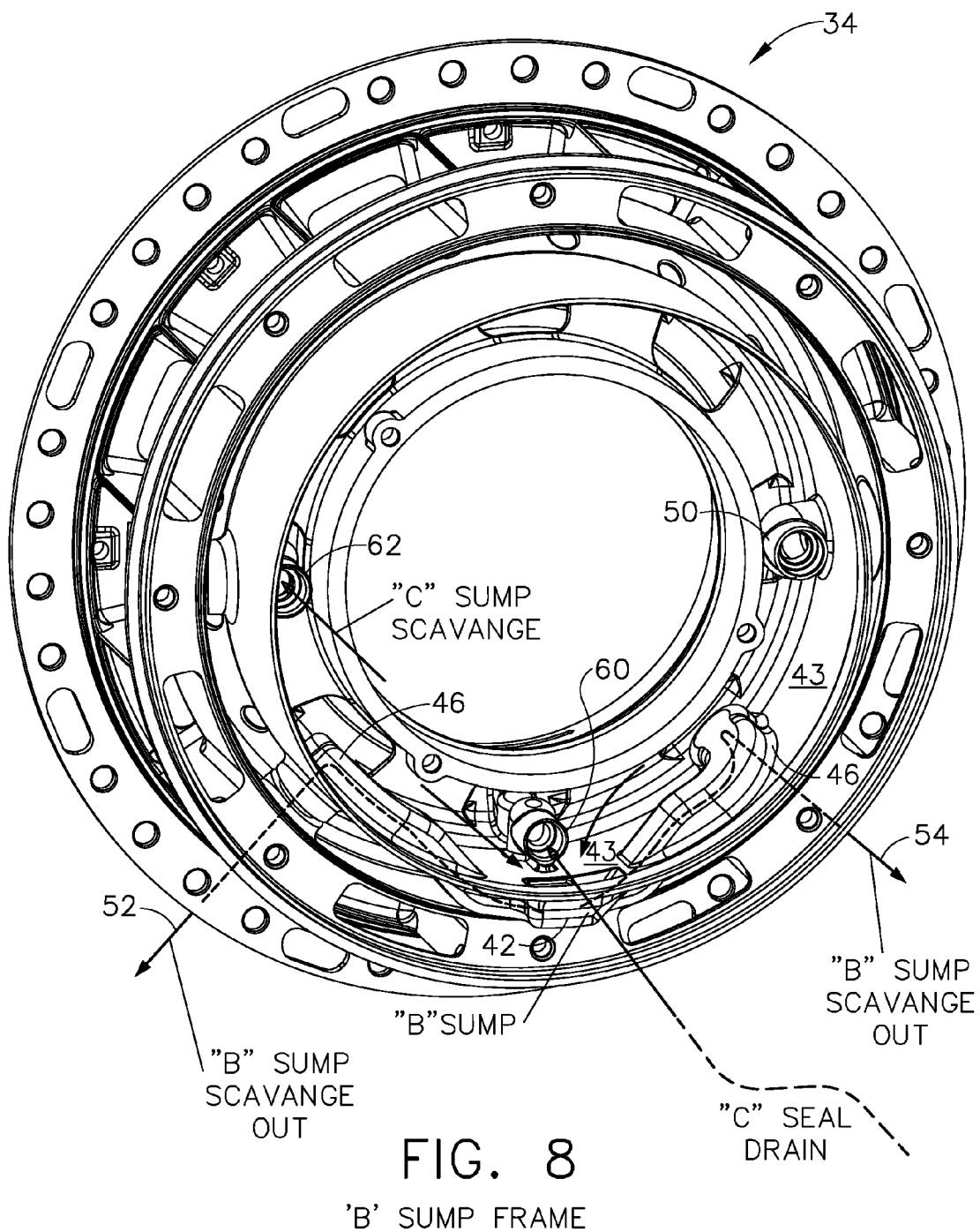
FIG. 8 depicts an isometric view of a B sump frame, according to an embodiment of the invention.

As shown in FIGS. 3 and 5, after lubrication of the bearings 70, oil passes through fore and aft scavenge passages 40 to a sump trap 42. Referring additionally to FIG. 8, once the oil reaches sump trap 42, the oil passes around a baffle 44 and is directed forward to a common passageway wherein the oil either moves to first forward sump scavenge 52 or the second forward sump scavenge 54. These are referred to commonly as the B sump scavenges 52, 54. The first B sump scavenge 52 is shown extending in the seven thirty o'clock position, again with reference to FIG. 2. The second B sump scavenge 54 exits the engine at the four thirty o'clock position.

Figure 9:
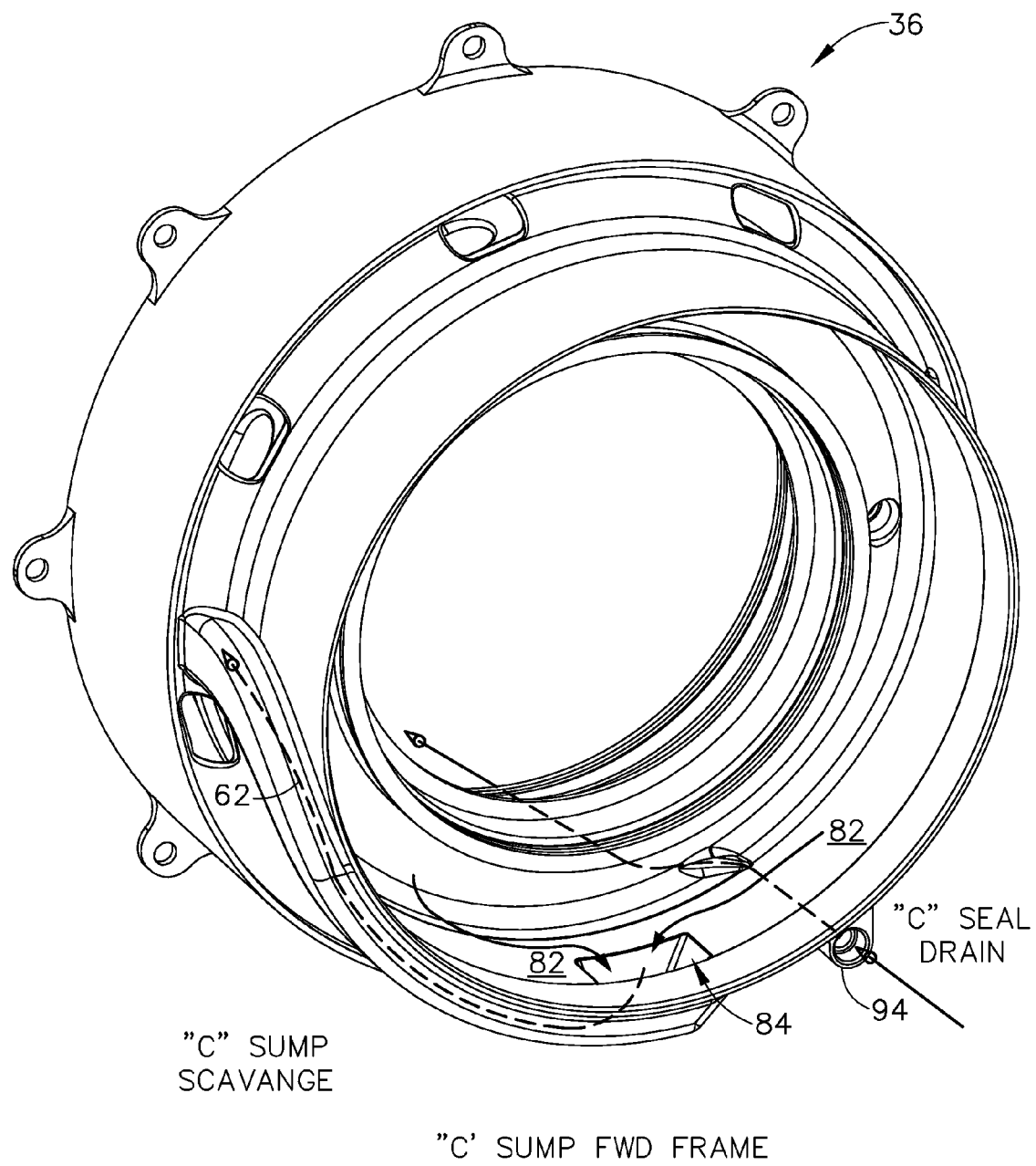
FIG. 9 depicts an isometric view of a C sump forward frame, according to an embodiment of the invention.

Still referring to FIG. 3, and moving aft along the frame assembly 32, the rear bearing assembly 74 is also shown and similarly includes a scavenge passageway or surface 80 adjacent the bearing assembly 74 which passes radially outward to a second passageway 82 and out to the sump trap 84. The section view of FIG. 5 also shows the supply oil passageway 72 feeding to the aft bearing assembly 74. The passageway 80 adjacent the bearing is depicted with through hole to the second passageway 82 feeding to the sump trap 84 (FIG. 3). With reference additionally to FIG. 9, the mid-frame member 36 shows the pathway 82 as well as the sump trap 84 wherein the oil is retrieved. An aft sump scavenge line 62 passes about the mid-frame member 36 partially circumferentially and turns in an axial direction to feed the forward frame member 34 and eventually passing radially out through the forward frame member 34 at the nine o'clock position, as shown in FIG. 2.

Additionally, with reference to FIGS. 2 and 3, the B/C sump drain 58 and the C sump drain 60 are depicted extending from the front frame member 34 in generally the six o'clock position. The B sump/C Sump drain 58 receives oil from the forward or B-sump 31 and also receives oil from the forward C-sump 33. This is a combined drain for oil which leaks beyond sump seals. The C-sump drain 60 receives oil leaked from the C-sump aft seal, according to the exemplary embodiment. However, alternate configurations and combinations are within the scope of the present disclosure. The B/C and C-aft sump drains 58, 60 receive oil that leaks beyond the scavenge passageways, for example, passageway 40. The sump drains 58, 60 are shown depending in FIG. 3. The B/C sump drain 58 is axially forward of the bearing assembly 70 and receives oil in slot 90, which extends about the forward frame member 34. FIG. 3 depicts arrows pointing into groove or slot 90 which represents leaked oil flow. Leaked oil is collected from fore and aft B-sump 31 seals as well as from fore C-sump 33 seal via path 98 (FIGS. 3, 6).

Figure 6:
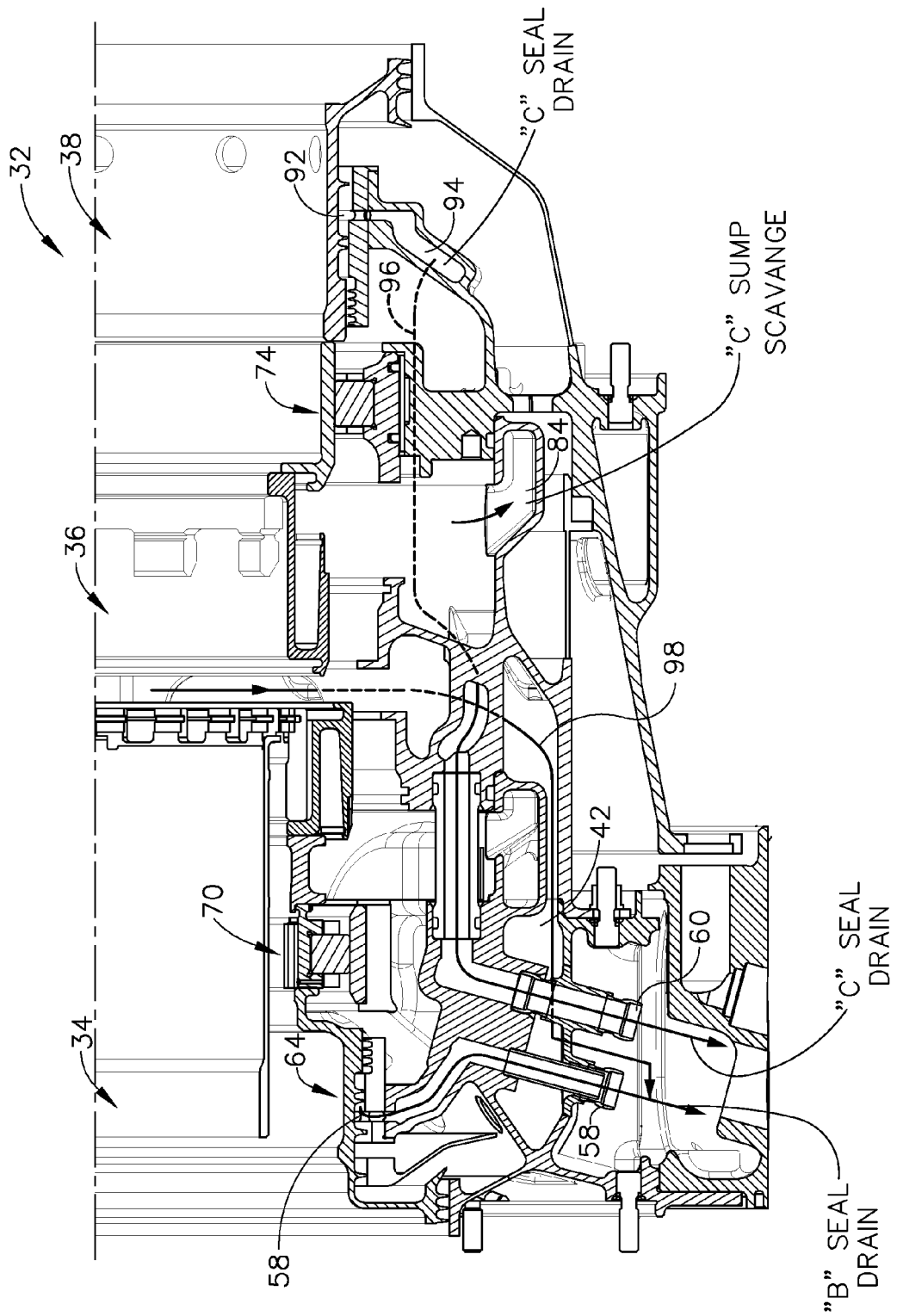
FIG. 6 depicts a vertical section of the aft seal drains, according to an embodiment of the invention.

With reference now to FIG. 6, a vertical section of the lower portion of engine 10 is depicted. Radially forward of the bearing 70 is a B sump or first sump seal 64. Immediately forward of the B sump seal 64 is the B sump drain 58. The drain is shown with a line extending through the passageway indicating an oil path outward of the engine. This figure as depicted in FIG. 3 is shown cut on a vertical plane such that the B seal drain 58 is extending from the engine in a vertical orientation. FIG. 6 also shows how the fore C-sump seal drain path 98 is collected and combined with the B-sump drain to exit at the combined drain 58.

The C sump drain 60 is also depicted in FIG. 6. The C sump drain is formed in an angular groove 92 at the C sump or aft sump seal. Referring initially to bearing assembly 74 and moving aft through the engine, the C sump drain groove 92 allows oil passage from the aft frame member 38 through a passage 94. The C sump drain groove 92, passage 94 these are also shown clearly in FIG. 10. The pathway 94 passes through the mid-frame member 36 toward the front or forward frame member 34. This is indicated in FIG. 6 by broken line 96. The line continues in solid line and is shown in the forward frame member 34 and passes through the forward frame member outwardly to atmosphere at drain 60.

With these descriptions, the combined sump service 30 depicts how two sump areas with support for bearing assemblies may be mounted from a single engine frame member in a sump frame assembly 32 using a single oil supply 50 which passes through the first sump and second sump providing oil to lubricant dependent components. The disclosure further depicts a forward sump scavenge which receives lubrication after the lubricant has passed through the lubricant dependent component, such as the forward bearing assembly 70. The disclosure additionally teaches the second scavenge line which passes from the aft sump through the forward sump area and out of the engine to a reservoir with the forward sump scavenge system. Finally, the combined sump service provides independent and combined sump drains for the forward and aft sump in this combined sump assembly 30.

Referring again to FIG. 3, the frame assembly 32 includes the forward and aft frame members 34, 36, 38. These members may be welded together to form integral sump frame assembly 32. Alternatively, and according to some embodiments, the frame members 34, 36, 38 are bolted together. The forward frame member 34 houses the bearing assembly 70 supporting rotation of for example, a high pressure turbine shaft. The oil supply 50 feeds bearing assembly 70 and the scavenge paths 40 adjacent the bearing assembly 70 receives oil sprayed into the area for lubrication purpose. The scavenge passageways 40 feed to the sump trap 42 and the oil is collected by way of scavenge lines 52, 54. The oil supply 50 includes a connected passageway 72 extending back to the bearing assembly 74.

When oil passes beyond the pathways 40 for the first or forward sump trap 42, the oil moves axially forward to the B sump drain 58. The sump drain slot 90 extends annularly about the forward frame member 34 wherein leaking oil is directed out the B sump drain 58. This drain path 90 is depicted by arrows passing out of the engine. As shown in FIG. 2, the drains extend out at the six o'clock position.

The frame members 34, 36, 38 are annular in nature and have a plurality of pathways allowing oil and air to move through the engine 10 as needed. The assemblies are connected together and further provide continuing passageways at interfaces between the connecting members. The pathways of the supply, scavenge and drain systems may extend in various directions including axially radially and circumferentially, including combinations thereof.

Figure 4:
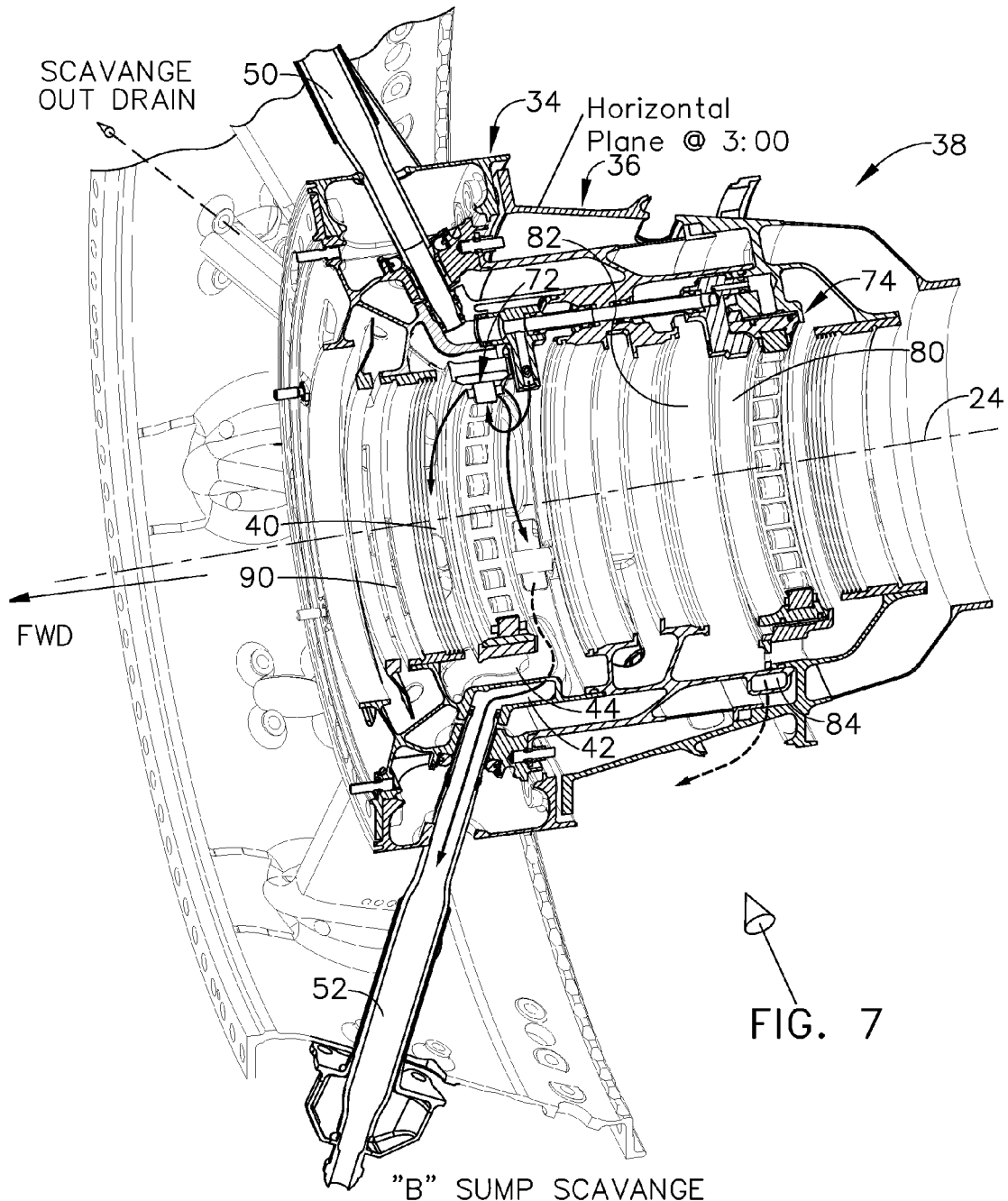
FIG. 4 is a quadrant section of the sump frame assembly at a different section plane than that of FIG. 3, according to an embodiment of the invention.

Referring to FIG. 4, another quadrant section wherein the figure is cut in two sections. The upper half of the frame assembly 32 is cut through a horizontal plane at the three o'clock below the center line 24 the frame assembly 32 is cut in a plane at the seven thirty o'clock position is shown with the B sump scavenge line 52 depicted passing out of the front frame member 34.

Through this plane at the seven thirty o'clock position, the scavenge passage 52 is depicted. Again, the figure clearly depicts the oil supply 50 feeding through the first and second bearing assembly 72, 74.

FIG. 4 also depicts the scavenge system of the aft bearing assembly 74 wherein the oil drains along the passage or surface 80 and into a secondary passage 82 to a sump trap 84. The sump trap 84 meets an aft or C sump scavenge 62. Although not shown in FIG. 4, the C sump scavenge 62 is depicted schematically in FIG. 2 exiting the engine at the nine o'clock position.

Referring now to FIG. 5, a horizontal section view is depicted in FIG. 3 the frame members 34, 36, 38 are all depicted. These members may be bolted, fastened, welded, brazed or otherwise connected together to form an integral unit containing the two sumps 31, 33. The oil supply 50 is depicted coming into the aft frame assembly 32 having the combined sump area 30. The oil flow then passes through a nozzle and feeds bearing assembly 70. The oil exits the bearing through scavenge paths 40. The oil is depicted by broken line arrow passing through these passages 40. At the aft bearing assembly 74, the oil passes through the bearing for lubrication and exits toward the sump trap 84 through passage for surface 80 and into the passage 82. The passages 40 and 80 are generally formed in the frame assembly 32 so as to limit the amount of tubing used in the engine and therefore decrease the number of parts needed for manufacture, the weight of the aircraft engine and improving manufacturability.

Referring now to FIG. 6, a vertical section of the lower portion of the engine depicts the B and C sump areas. The three frame members 34, 36, 38 defining the frame assembly 32 are shown. At the forward frame member 32, the B sump drain 58 and the C sump drain 60 are shown wherein these structures exit the engine. Radially inwardly along the B sump drain 58, the drain structure of the first frame member 34 is positioned adjacent the B sump seal 64. The C sump drain 60 feeds from the rear frame member 38 and the oil pathway is depicted with both broken and solid line to indicate the path from the aft to the forward portion of the frame assembly 32.

Figure 7:
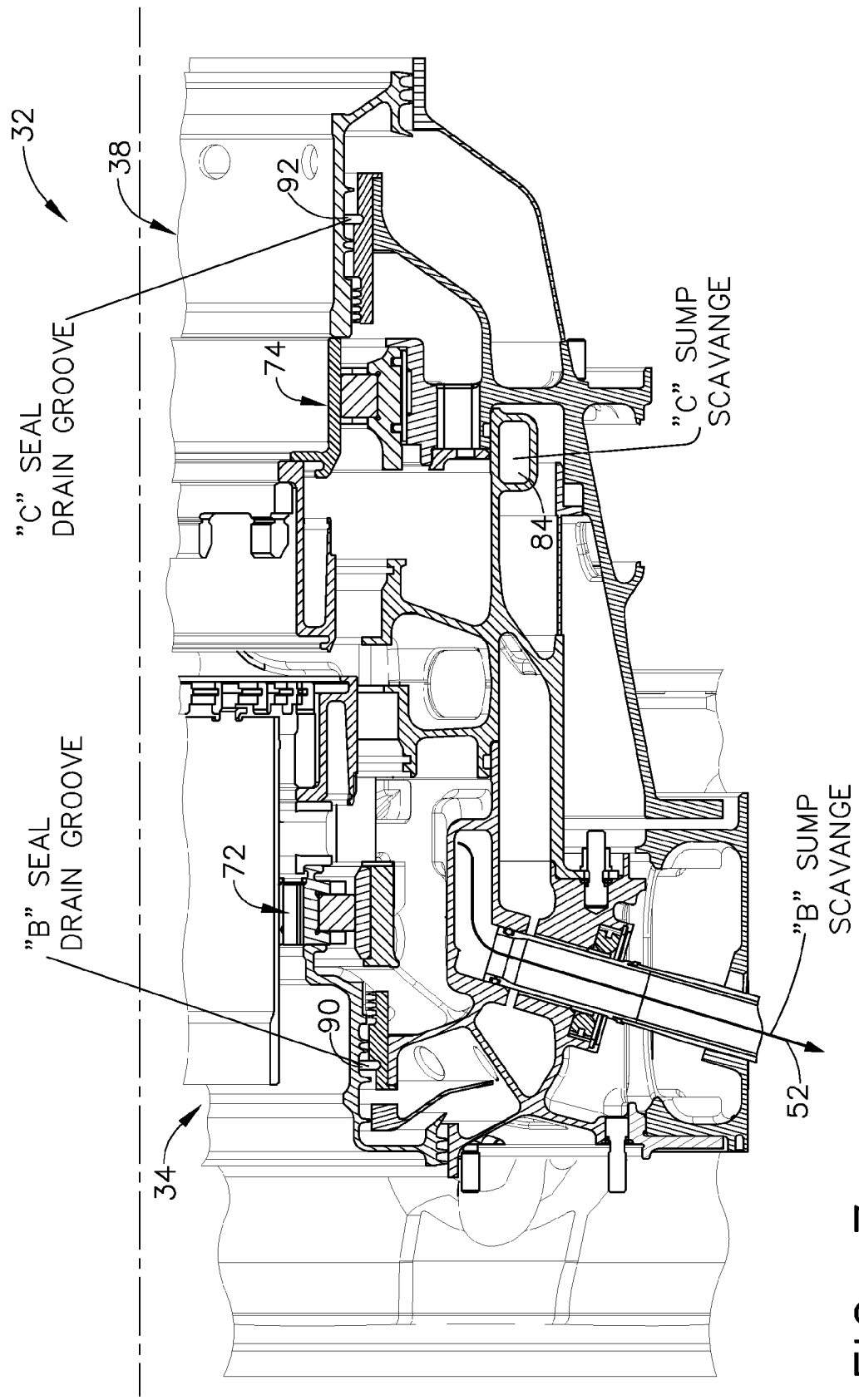
FIG. 7 depicts a section view of the lower section depicted in FIG. 4 and depicts the B and C sump scavenge lines, according to an embodiment of the invention.

Referring now to FIG. 7, the B seal drain groove 90 and C seal drain groove 92 are shown in the frame assembly 32. The B sump drain 58 is located within the forward sump frame member 34. The C sump drain groove 92 extends annularly about the aft frame member 38. This drain groove 92 is in flow communication with a pathway 94, 96 (FIG. 6) extending toward the front or forward frame member 34 where the B sump drain and C sump drain lines 58, 60 eventually drains to the atmosphere. The frame assembly 32 is cut along a plane in the seven-thirty o'clock position as depicted in FIG. 2.

Referring now to FIG. 8 shows a forward frame member 34. The annular structure includes the B sump trap 42 which feeds oil from surface 43. After the oil travels down into the sump trap 42, the oil travels about a baffle 44 (FIG. 4) and upwardly through integral passageway 46 and out through the B sump scavenge paths 52, 54. The pathway for the C sump drain 60 which feeds out at the six o'clock position. The C sump scavenge 62 and oil supply 50 are also shown.

Referring to FIG. 9, a mid-frame member 36 is shown. The structure is also generally annular with a hollow central portion as with the forward frame member 34. The C sump scavenge is depicted for feeding through the path 62 of FIG. 9 to the fixture 62 of FIG. 8. The C sump scavenge shown in solid line along path 82 and further through the mid-frame member 36 in broken line through path 62. Structure turns for a limited circumferential distance and then turns again in the axial direction to reach the central fixture 62 of FIG. 8. The C sump for aft sump structures allow for scavenge oil which has to pass through the bearings in the aft bearing assembly 74. This oil scavenge is shown in broken line along path 62 passing circumferentially about the frame member 36 to the nine o'clock position where the oil travels toward the front frame member 32.

Referring now to FIG. 10, an isometric view of the aft frame member 38 is depicted is a partial section cut. The drain groove 92 is depicted which receives oil which is passed beyond the scavenge path, 80, 82. The drain groove 92 feeds to a drain passage 94 which feeds forward through the mid-frame member 36 and to the forward frame member 34. The passage 94 of FIG. 10 extends through the path 94 of FIG. 9 defining a single passageway toward the front of the frame assembly 32 at sump drain 60.

The present disclosure therefore describes how a frame assembly 32 includes two sumps and is cantilevered from a single engine frame. This simplified routing provides that both sump traps 42, 84 share common supply lines and a common pressurization circuit. Additionally the scavenged circuit is routed from an aft sump area to a forward sump are but the scavenge circuits remain separate. The advantages of this system provide that the two sumps are as close together as possible and therefore reduce the amount of tubes in the engine. This reduces weight and the space requirements for the sump structures which service bearing assemblies 70, 74.

The combined sump service utilizes a mount for a first sump and a second sump area. A single internal supply line feeds oil to the first sump and the second sump. A first scavenge line and a second scavenge line are in flow communication with the first and second sumps respectively wherein one of the first and second scavenge line passes through the area of the other of the first and second scavenge lines. The structure may utilize a shared drain line for oil which leaks beyond the scavenge system.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims

What is claimed is:

1. A combined sump structure in an engine, the combined sump structure comprising
   a sump area comprising one or more sumps, including at least a B sump and a C sump;
   a single oil supply for all sumps;
   a combined sump drain; and
   a single frame assembly configured to support the one or more sumps,
   where in the B sump comprising a middle member and a forward member,
   where in the C sump comprising an aft member and the middle member, and
   wherein the sump frame assembly comprises the middle member, wherein the middle member comprises an aft sump scavenge line passing about the middle member partially circumferentially and turning in an axial direction to feed the forward member.

2. The combined sump structure of claim 1, further comprising:
   one or more B sump scavenges; and
   one or more C sump scavenges,
   where in the combined sump drain is a B/C sump drain.

3. The combined sump structure of claim 2, further comprising:
   a single supply oil passageway;
   where in the oil supply extends through the supply oil passageway in the aft direction passing into the frame assembly at a forward end of the aft member and through the middle member and the aft member.

4. The combined sump structure of claim 3, wherein the oil supply passes through the B sump to reach the C sump.

5. The combined sump structure of claim 3, wherein the sump frame assembly comprises a rear bearing assembly, wherein the rear bearing assembly comprises a scavenge passageway, or a surface adjacent the rear bearing assembly, which passes radially outward to a sump trap, the supply oil passageway feeding to the aft bearing.

6. The combined sump structure of claim 5, wherein the aft sump scavenge line eventually passes radially out through the forward member.

7. The combined sump structure of claim 6, further comprising an aft mounted C sump drain, wherein the B/C sump drain and the C sump drain extend from the forward member in generally the six o'clock position, and the B/C sump drain receives oil from both the B sump and the C sump and thereby comprising a combined drain for oil which leaks beyond sump seals.

8. The combined sump structure of claim 7, wherein the B/C sump drain and the C sump drain receive oil that leaks beyond a scavenge passageway, wherein the B/C sump drain is located axially forward of a forward bearing assembly, and receives oil in a slot which extends about the middle member, and wherein leaked oil is collected from a fore and an aft B sump seals as well as from a forward C sump seal.

9. The combined sump structure of claim 8, wherein the C sump drain is formed in an angular groove at the forward C sump seal thereby allowing oil passing from the aft member through a passage, and then passing through the middle member toward the forward member.

10. A combined sump structure, comprising:
    one or more sump areas with support for bearing assemblies;
    a sump frame assembly comprising a single engine frame member, wherein the combined sump structure is mounted from the single engine frame member in the sump frame assembly using a single oil supply which passes through the one or more sump areas providing oil to lubricant-dependent components;
    a first sump scavenge line which receives lubrication after the lubricant has passed through a lubricant-dependent component to include a first bearing assembly;
    a second sump scavenge line which passes from one of the sump areas through the sump area and out of an engine to a reservoir with a first sump scavenge system; and
    independent and combined sump drains for one or more sumps;
    wherein the sump frame assembly further comprises forward, middle and aft members;
    wherein the one or more sump areas is a B sump area disposed within the forward member and the middle member and a C sump area disposed within the middle member and the aft member; and
    wherein a drain structure of the forward member is positioned adjacent to a B sump seal, at a position radially inward along a B sump drain.

11. The combined sump structure of claim 10, wherein
    the first sump scavenge line is a forward sump scavenge line;
    the second sump scavenge line is an aft scavenge line; and
    the one or more sumps is a B sump and a C sump.

12. The combined sump structure of claim 11, wherein the sump frame assembly comprising members formed as a single element or welded or bolted together to form an integral sump frame assembly, thereby being of either monolithic construction or of unitary construction.

13. The combined sump structure of claim 12, wherein:
    the members are annular in nature and have a plurality of pathways disposed therewithin allowing oil and air to move through the engine;
    the members are connected together to allow fluid communication therewithin and there between, further providing continuing passageways at interfaces between the connecting members; and,
    pathways of the supply, scavenge and drain systems extend in various directions and orientations selected from the group axially, radially and circumferentially, to include combinations thereof.

14. The combined sump structure of claim 13, further comprising:
    a B/C sump drain and a C sump drain at the forward member, wherein the B/C sump drain and the C sump drain exit the engine;
    where in the C sump drain feeds from the aft member, and an oil pathway is from the aft to a forward portion of the sump frame assembly.

15. The combined sump structure of claim 14, wherein:
    the middle member is annular in nature and further comprises a hollow central portion, and a C sump scavenge is disposed along a path therewithin the middle member and further through the middle member along a continued path, thereafter turning for a limited circumferential distance and then turning again in an axially inward direction to reach the central fixture.

16. The combined sump structure of claim 15 wherein the middle member:
    provides scavenge for the C sump,
    forms an aft wall of the B sump and a forward wall of the C sump, and
    passes oil supply from the B sump to the C sump.

17. A frame assembly, comprising:
    two sumps, wherein the frame assembly is cantilevered from a single engine frame;
    two sump traps, wherein the frame assembly provides simplified routing to the two sump traps thereby providing shared common supply circuits and lines and a common pressurization circuit between the sump traps; and
    a scavenged circuit routed from an aft sump area, the scavenged circuit comprising a first sump to a forward sump area and a second sump, wherein the scavenge circuit remains separate from the supply circuits thereby resulting in a system wherein the two sumps are located proximally one to the other.

18. The frame assembly of claim 17, further comprising a mount for a first sump being a forward sump and an aft sump area wherein a single internal supply line feeds oil to the forward sump and to a second sump being an aft sump.

19. The frame assembly of claim 18, further comprising a first scavenge line and a second scavenge line in flow communication with the forward and aft sumps, respectively, wherein one of the first and the second scavenge lines passes through the area of the other of the first and the second scavenge lines.

20. The frame assembly of claim 19, further comprising a shared drain line for oil which leaks beyond the scavenge system.

* * * * *